FREQUENCY DISCRIMINATOR WITH VIBRATING MAGNETIC MASS

Filed April 14, 1961 2 Sheets-Sheet 1

INVENTORS
EMMOR V. SCHNEIDER
BY JOHN MIHAILA
Woodling, Krost, Granger and Rust,
ATTORNEYS Oct. 19, 1965 E. V. SCHNEIDER ETAL 3,213,331

FREQUENCY DISCRIMINATOR WITH VIBRATING MAGNETIC MASS

Filed April 14, 1961 2 Sheets-Sheet 2

INVENTORS
EMMOR V. SCHNEIDER
BY JOHN MIHAILA
Woodling, Krost, Granger and Rust,
ATTORNEYS United States Patent Office 3,213,331

Patented Oct. 19, 1965

3,213,331

FREQUENCY DISCRIMINATOR WITH VIBRATING MAGNETIC MASS

Emmor V. Schneider and John Mihaila, Alliance, Ohio, assignors to Consolidated Electronics Industries Corp., a corporation of Delaware Filed Apr. 14, 1961, Ser. No. 103,058
9 Claims. (Cl. 317—147)

The invention relates in general to frequency discriminators or frequency selective transducers and, more particularly, to an electro-mechanical device which will receive energy either mechanically or electrically and transform this energy by a resonant characteristic through mechanical means into an electrical output.

The frequency discriminator of the invention may be used in radio apparatus wherein a modulated or interrupted carrier wave is received and the modulation or interrupted frequency rate is applied to an electrical input of the device. The device is frequency selective and if the incoming modulation frequency is of the proper value, then a mass will vibrate, for example in torsion, and this vibration establishes an output signal at a frequency in accordance with the input signal.

Prior art devices used as frequency selective devices on the inputs of radio receivers and the like often had the disadvantage of being sensitive to mechanical vibration so as to give rise to false signals. Also, many prior art devices were sensitive to variations in the level of the incoming signal and did not have a wide range of operation for various input signal levels.

Accordingly, an object of the present invention is to provide a frequency discriminator which is rugged, stable and reliable and one which is not subject to spurious operation by mechanical vibration.

Another object of the invention is to provide a frequency selective transducer which is operable over a wide range of signal input levels and yet is one which has a narrow band of frequencies to which it is sensitive.

Another object of the invention is to provide an electrical to mechanical to electrical transducer, with the mechanical movement insensitive to normal mechanical vibrations or extraneous shocks.

Another object of the invention is to provide a device which is frequency discriminating on the input as well as on the output.

Another object of the invention is to provide a frequency discriminator wherein an electrical input causes torsional vibration of a mass of magnetic material and this vibration produces an electrical output in accordance with the frequency of the input.

Other objects and a fuller understanding of this invention may be had by referring to the following description and claims, taken in conjunction with the accompanying drawings, in which:

Figure 1:
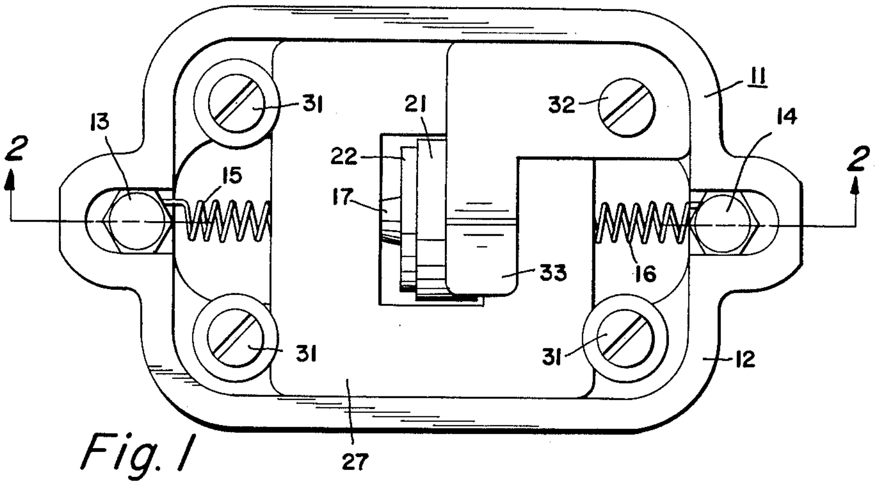
FIGURE 1 is a top view of a frequency discriminator embodying the invention.
Figure 2:
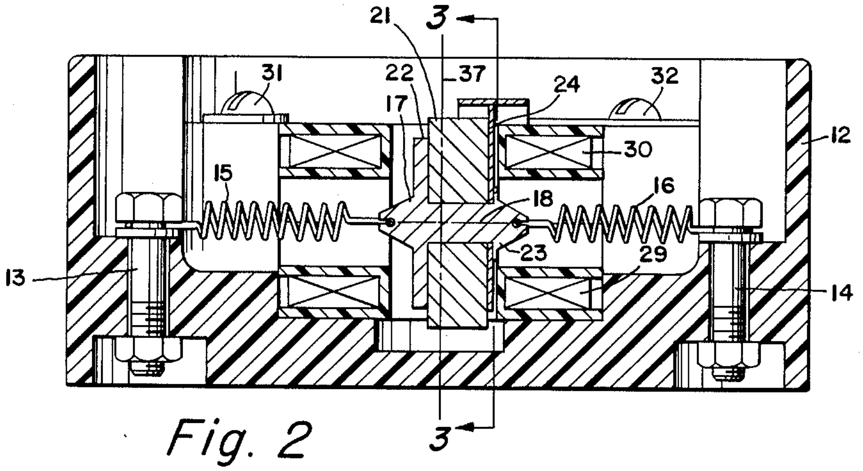
FIGURE 2 is a longitudinal vertical sectional view on line 2—2 of FIGURE 1.
Figure 3:
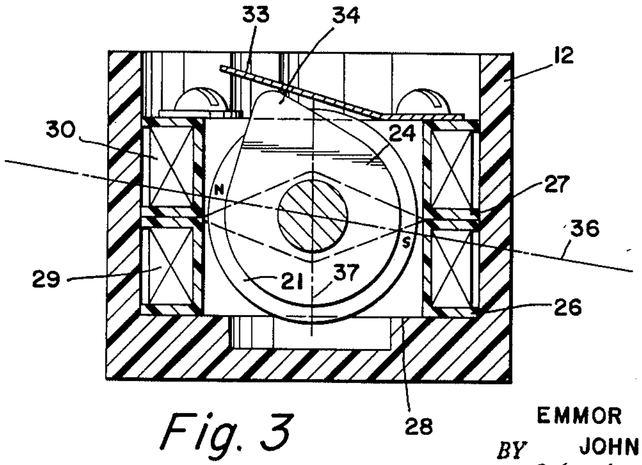
FIGURE 3 is a sectional view on line 3—3 of FIGURE 2.

FIGURES 1, 2 and 3 illustrate a frequency discriminator 11 which embodies the invention. This discriminator may be mounted in an insulated housing 12 which may also be provided with a suitable cover, not shown. Mounting screws 13 and 14 extend through suitable apertures in the housing 12 and mount first and second springs 15 and 16 on a non-magnetic hub 17. The hub

17 has a first axis 18 with the springs 15 and 16 disposed along this axis and fastened to the hub. A ring permanent magnet 21 is fixedly mounted on the hub 17 in any suitable manner. The drawing shows the hub as having an integral flange 22 bearing against one face of the magnet 21 and a peened head 23 formed from material of the hub 17. For this purpose, the hub may be made of die-cast zinc, for example. The peened head 23 also fixes a contactor strip 24 on the other face of the magnet 21.

First and second coil forms 26 and 27 are mounted in a recess 28 in the housing 12. These coil forms are disposed one on top of the other at the two lateral sides of the housing 12, yet are spaced apart at those portions near the two opposite ends of the housing 12 to permit clear passage of the two springs 15 and 16 between these two coil forms. First and second coils 29 and 30 are wound on the coil forms 26 and 27, respectively, and constitute winding means to coact with the permanent magnet 21.

Mounting screws 31 retain the coil forms in place and a fourth one of these mounting screws 32 also holds a contact strip 33. This contact strip lies generally tangent to the periphery of the ring magnet 21 and is disposed to cooperate with a rounded projection 34 of the contactor strip 24.

The permanent magnet ring 21 is designed to be magnetized generally diametrically with the poles disposed on a second axis 36. This axis is generally perpendicular to the first axis 18 and may also be generally perpendicular to a third axis 37 which is the axis of the coils 29 and 30. Axis 36 is shown as not quite perpendicular to axis 37, but the magnet may be so positioned if desired.

Figure 4:
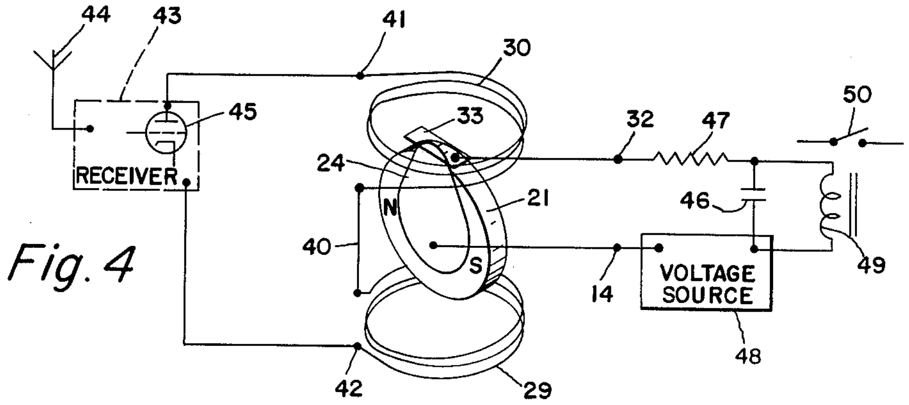
FIGURES 4, 5 and 6 are schematic diagrams of various circuits in which the frequency discriminator may be used.

The frequency discriminator of FIGURES 1, 2 and 3 may be connected in a circuit as shown in FIGURE 4. This is a schematic diagram showing the first and second coils 29 and 30 connected in series by a conductor 40. Input terminals 41 and 42 for these coils may be two of the mounting screws 31. FIGURE 4 shows a receiver 43 having an antenna 44 to receive a radio frequency carrier wave which is interrupted or modulated at a lower frequency. This may be a sub-audio frequency, for example, 22 cycles. The receiver 43 includes an amplifier shown as an amplifier tube 45 and this amplifier tube may be a detector or an amplifier subsequent to a detector. As such, the intelligence or modulation component, in this example 22 cycles, is supplied from the receiver 43 to the input terminals 41 and 42.

The frequency discriminator 11 is designed to have a natural torsional vibration frequency of a particular value. This is determined by the moment of inertia and spring constant of the spring and magnet assembly. This spring and magnet assembly includes the springs 15 and 16, the hub 17, the permanent magnet 21 and the contactor strip 24. The springs 15 and 16 are stressed in tension for initial support of the magnet 21 but vibration of this magnet is in a path which is oscillatory about the axis 18. This torsional vibration might in the order of 60°, for example, and in this example, the natural torsional vibration frequency is stated to be 22 cycles. This may easily be varied by changing the spring constant or the moment of inertia of the mass. The spring constant may be changed by changing the gauge of the wire, the material of the wire, the number of turns and the diameter of the turns.

If the incoming frequency applied to the winding means 29–30 agrees with the natural frequency of vibration of the mass, then the changing polarity of magnetic poles along the coil axis 37 will react with the poles of the magnet 21 to urge it into torsional vibration. This torsional vibration, when of sufficient amplitude, will cause make and break of the electrical contact between the contactor strip 24 and the contact strip 33. An electrical output from the frequency discriminator 11 may be provided by one output terminal at the mounting screw 32 and another electrical output terminal at the mounting screw 14 which electrically connects to the contactor strip 24 through the spring 16. The output terminals 14 and 32 control energization of a pilot relay 49. A direct current voltage source 48 is provided for this energization and the relay 49 and voltage source 48 are connected in series with a resistor 47 across the terminals 14 and 32. The resistor 47 is part of a time delay circuit including a capacitor 46. The pilot relay 49 may control normally open contacts 50 for control of any desired device. The contactor strip 24 and contact strip 33 may be positioned normally out of engagement and upon vibration of the magnet 21, these contacts will intermittently close to energize the relay 49 through the voltage source 48. The time delay circuit delays the initial energization of the relay 49 to eliminate any false signals and also smooths the voltage pulses applied to the relay 49 to maintain it energized.

One use of this circuit and structure arrangement of FIGURES 1 to 4 is in remote control radio devices such as those used to control garage door operators by radio. A pre-selected signal of a given carrier and modulation or interruption frequency may be radiated by a suitable remote control transmitter. If the combination of carrier frequency and modulation or interruption frequency is correct, then the modulation frequency appearing at terminals 41 and 42 will cause torsional vibration of the magnet 21.

Figure 5:
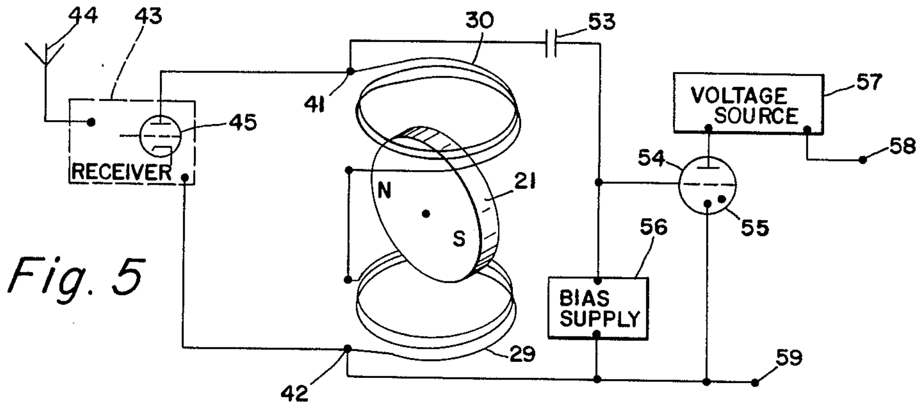

FIGURE 5 shows an alternative circuit for utilization of the frequency discriminator 11. In this circuit the receiver 43 again passes the modulation or interruption frequency rate to the serially connected coils 29 and 30. The magnet 21 need not have any contactor strip 24 and, instead, the electrical output from the discriminator 11 appears at the same input terminals 41 and 42. This output signal is passed by a D.C. blocking and coupling capacitor 53 to the grid 54 of an amplifier such as a cold cathode gas filled thyratron 55. A bias supply 56 may bias the thyratron 55 to just below cutoff with a voltage source 57 supplying anode voltage to the thyratron 55. The voltage source 57 and thyratron 55 are connected in series between output terminals 58 and 59.

The circuit of FIGURE 5 operates in a manner similar to the circuit of FIGURE 4. When the modulation or interruption frequency from the receiver 43 agrees with the natural vibration frequency of the magnet 21, then this magnet will vibrate torsionally. In so doing, the flux of the magnet will cut the turns of the coils 29 and 30 and will thus generate a back E.M.F. This will considerably raise the impedance of the coils 29 and 30. These coils may conveniently be constructed of many turns of fine wire to have a D.C. resistance in the order of 1,000 or 2,000 ohms. As such, they will have a suitable impedance for the plate load of a vacuum tube. However, when the back E.H.F. is generated, this will raise the effective impedance of these coils many-fold. For example, in the order of 7,000 to 50,000 ohms. This considerably increased impedance of the coils 29 and 30 will greatly increase the voltage drop there-across and this increased voltage drop may easily be in the order of 5 to 50 volts, which will be sufficient to change the thyratron 55 from a cutoff to a conducting condition. Accordingly, a closed circuit is established at the output terminals 58 and 59. The increased impedance of the coils 29 and 30 occurs because of the vibration of the magnet 21 when it is vibrating on frequency and, thus, the discriminator 11 is frequency discriminating on the input as well as on the output. This means that the load of the discriminator 11 on the receiver 43 decreases as the proper signal is received on the antenna 44. The frequency discriminator 11 naturally has some slight variations in frequency response, but it has been found to be quite sharp and the exact frequency on the input corresponding to the natural vibration frequency causes wide excursions of the vibration of the magnet, so that many lines of force from the magnet cut the turns of the coils and, thus, a very large back E.M.F. is generated.

Figure 6:
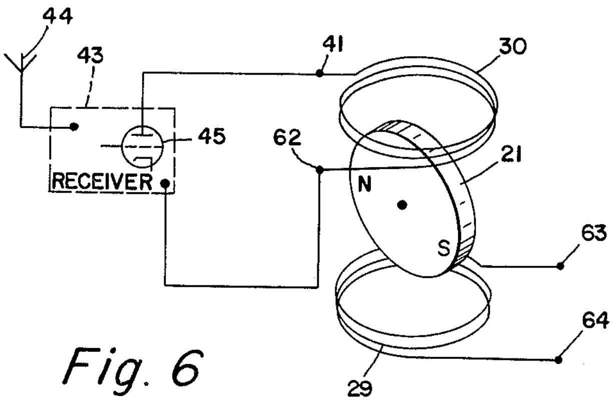

FIGURE 6 shows still another modified circuit in which the frequency discriminator 11 may be used. In this circuit arrangement, the coil 30 is used as an input coil at terminals 41 and 62. The coil 29 is used as an output coil at terminals 63 and 64. Similarly to the operation of the circuits of FIGURES 4 and 5, when the proper frequency is passed by receiver 43 to the terminals 41 and 62, the magnet 21 will vibrate. This vibration of the magnet 21 causes the flux of the magnet to cut the turns of the coil 30 to again generate a back E.M.F. in this coil. Also, the flux of the magnet 21 cuts the turns of the output coil 29 and this rate of change of flux develops an output voltage at the output terminals 63 and 64. This output voltage will be determined by the rate of vibration of the magnet 21 which, in turn, is in accordance with the frequency rate applied to the input terminals 41 and 62. This circuit shows the frequency discriminator 11 acts as a frequency selective transformer by a special type of resonant transformation action. The magnet 21 may generally be one of high coercive force and , accordingly, will not easily be changed by the lower M.M.F. of the coils. Thus, the two coils 29 and 30 are not linked by a soft iron core as it would appear and, thus, do not act as a regular transformer, but rather act similarly to an air core transformer. The transducer or transformation action occurs because of the vibration of the magnet 21 with its varying flux cutting the turns of coil 29 as well as the turns of coil 30. The voltage appearing at the output terminals 63 and 64 will be directly in accordance with the excursion of torsional vibration of the magnet 21. These output terminals 63 and 64 may be connected to a pilot relay such as the connection to relay 49 in FIGURE 4 or may be connected to the input of an amplifier such as amplifier 55 of FIGURE 5.

The frequency discriminator 11 is a simple, reliable and rugged device. The magnet and spring assembly is essentially dynamically balanced so that shocks or mechanical vibrations in any of three mutually perpendicular directions do not cause any appreciable vibration of the magnet, especially torsional vibration. Accordingly, false output signals are eliminated. The frequency discriminator 11 utilizes an electrical input signal and transforms this into a mechanical movement at the vibration of the magnet which, in turn, is transformed into an electrical output signal at the same frequency. This double transformation eliminates any spurious operation caused by false electrical signals on the antenna 44. The discriminator 11 also has a wide range of response of levels of input voltage because once the threshold level is reached at which the magnet vibrates sufficiently to make and break the contacts 24–33, it does not matter how much further the input voltage is increased. Such increase of input voltage creates wider excursions of vibration of the magnet and this increases the effective impedance of the coils 29 and 30 and, thus, limits the input current through these coils.

The magnet 21 is a means establishing a second magnetic field in the vibratory mass which cooperates with the first field from the winding means 29–30 to impart torsional vibrations to the mass.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A frequency discriminator, comprising, in combination, a base, a mass of magnetic material having an axis, torsion spring means acting axially on said mass and mounting said mass relative to said base, said mass and spring assembly having a natural torsional vibration frequency as determined by the moment of inertia and spring constant thereof, said mass adapted to have poles disposed transversely of said axis on a second axis, winding means having first and second coils and having an axis transverse to said second axis, input means to impress a periodic voltage on said winding means to establish a first alternating field transverse to said second axis to act on said mass, means to establish a second field in said mass cooperating with said first field to impart torsional vibrations to said mass, said first and second coils being inductively coupled essentially only through torsional vibrations of said mass, and means to obtain an output signal from said second coil at a frequency in accordance with the frequency of said input when the periodic frequency of said input voltage agrees with the natural torsional vibration frequency of said mass and spring assembly and said mass is urged into torsional vibrations of a given amplitude.

2. A frequency discriminator, comprising, in combination, a base, a mass of magnetic material having an axis, torsion spring means acting axially on said mass and mounting said mass relative to said base, said mass having poles disposed transversely of said axis on a second axis, said mass and spring assembly having a natural torsional vibration frequency as determined by the moment of inertia and spring constant thereof, winding means including first and second coils having an axis transverse to said second axis, input means to impress a periodic voltage on said first coil to establish an alternating field transverse to said second axis to act on said mass and effect vibrations thereof, said coils being inductively coupled essentially only through vibrations of said mass, and means to obtain an output signal from said second coil at a frequency in accordance with the frequency of said input when the periodic frequency of said input voltage agrees with the natural torsional vibration frequency of said mass and spring assembly and said mass is urged into torsional vibrations of a given amplitude.

3. A frequency discriminator, comprising, in combination, a base, a mass of magnetic material having an axis, torsion spring means acting axially on said mass and mounting said mass relative to said base, said mass having poles disposed transversely on said axis on a second axis, said mass and spring assembly having a natural torsional vibration frequency as determined by the moment of inertia and spring constant thereof, winding means including first and second coils connected in series and having an axis transverse to said second axis, input means to impress an alternating voltage on said serially connected coils to establish an alternating field transverse to said second axis to act on said means, said coils being inductively coupled essentially only through vibrations of said mass and generating a counter electromotive force in said coils to raise the effective impedance thereof and to raise the voltage across said winding means, and means to obtain an output signal from one of said coils in accordance with said raised voltage at the frequency of said input when the frequency of said input voltage agrees with the natural torsional vibration frequency of said mass and spring assembly and said mass is urged into torsional vibrations of a given amplitude.

4. A frequency discriminator, comprising, in combination, a base, a permanent magnet having an axis, torsion spring means acting axially on said magnet and mounting said magnet relative to said base, said magnet having poles disposed transversely of said axis on a second axis, said magnet and spring assembly having a natural torsional vibration frequency as determined by the moment of inertia and spring constant thereof, winding means including first and second air core coils spaced coaxially on opposite sides of said magnet, input means to impress an alternating voltage on said winding means to establish an alternating field transverse to said second axis to act on said magnet, whereby when the frequency of said input voltage agrees with the natural torsional vibration frequency of said magnet and spring assembly said magnet is urged into torsional vibrations, said coils being inductively coupled essentially only through vibrations of said magnet and the non-vibrating condition of said magnet establishing an inductive coupling many times smaller and generally in accordance with the air core of said coils.

5. A frequency discriminator, comprising, in combination, a base, a mass of permanently magnetized material having first axis, torsion spring means acting axially on said mass and mounting said mass relative to said base, said mass having poles disposed transversely of said axis on a second axis, said mass and spring assembly having a natural torsional vibration frequency as determined by the moment of inertia and spring constant thereof, contact means mounted to be actuated in accordance with oscillatory movements of said mass, winding means including first and second air core coils coaxially disposed generally perpendicular to said first axis and spaced on opposite sides of said mass, means to impress an alternating voltage on said winding means to establish an alternating field transverse to said second axis to act on said magnetic mass, whereby when the frequency of said input voltage agrees with the natural torsional vibration frequency of said mass and spring assembly said mass is urged into torsional vibrations of an amplitude sufficient to have said contact means intermittently actuated at said input frequency, said coils being inductively coupled essentially only through vibrations of said magnet and the non-vibrating condition of said magnet establishing an inductive coupling many times smaller and generally in accordance with the air core of said coils.

6. A frequency discriminator, comprising, in combination, a base, a permanent magnet having an axis, tension and torsion spring means acting axially on said magnet and mounting said magnet to said base with said spring means under axial tension, said magnet being magnetized transversely of said axis on a second axis, said magnet and spring assembly having a natural torsional vibration frequency as determined by the moment of inertia and spring constant thereof, a contactor fixed relative to said magnet, an electrode insulatively mounted on said base and disposed in a position for cooperation with said contactor, output terminals electrically connected to said electrode and to said contactor, first and second serially connected air core coaxial input coils surrounding said magnet and disposed generally on opposite sides of said second axis, and means to impress a sub-audio frequency voltage on said input coils to establish an alternating field transverse to said second axis to act on said magnet, whereby when said sub-audio frequency agrees with the natural torsional vibration frequency of said magnet and spring assembly said magnet is urged into torisonal vibrations of an amplitude sufficient to have said contactor intermittently engage said electrode at said sub-audio frequency.

7. A frequency discriminator for use with an incoming modulated carrier wave comprising, in combination, a base, a permanent magnet having an axis, first and second tension and torsion coil springs fixed relative to opposite axial ends of said magnet, means to mount the distal ends of said springs to said base with said springs under axial tension, said permanent magnet being magnetized transversely of said axis on a second axis, said magnet and spring assembly having a natural torsional vibration frequency as determined by the moment of inertia and spring constant thereof, first and second generally parallel coils surrounding said magnet and generally parallel to and on opposite sides of said second axis, means to impress a modulation frequency voltage on said first coil to establish an alternating field transverse to said second axis to act on said magnet, and means to obtain an output voltage from said second coil whereby when said input modulation frequency agrees with the natural torsional vibration frequency of said magnet and spring assembly said magnet is urged into torsional vibrations to develop an output voltage on said second coil at said modulation frequency.

8. A sub-audio frequency discriminator comprising, in combination, a base, a non-magnetic cylindrical hub having an axis, first and second tension and torsion coil springs fixed to opposite axial ends of said hub, means to mount the distal ends of said springs to said base with said springs under axial tension, a permanent magnet ring fixedly mounted on said hub and magnetized transversely of said ring on a second axis, said ring, hub and spring assembly having a natural torsional vibration frequency as determined by the moment of inertia and spring constant thereof, a contactor projection fixed relative to said magnet ring and electrically connected to said first spring, an electrode insulatively mounted on said base and disposed generally on a tangent to said ring periphery to lie in engagement with said contactor projection in the quiescent state of said ring, output terminals connected to said electrode and to said first spring, first and second serially connected input coils surrounding said ring and parallel to and on opposite sides of said second axis, and means to impress a sub-audio frequency on said input coils to establish an alternating field generally perpendicular to said second axis to act on said magnet ring, whereby when said sub-audio frequency agrees with the natural torsional vibration frequency of said magnet and spring assembly said magnet ring is urged into torsional vibrations of an amplitude sufficient to have said contactor projection intermittently enage said electrode at said sub-audio frequency.

9. A frequency discriminator for use with an incoming radio frequency carrier wave interrupted at a sub-audio rate, comprising, in combination, an insulator housing, a non-magnetic cylindrical hub having first axis, first and second tension and torsion coil springs fixed to opposite axial ends of said hub, means to mount the distal ends of said springs to said housing with said springs under axial tension, a permanent magnet ring fixedly mounted on said hub and magnetized along a second axis generally perpendicular to said first axis, said ring, hub and spring assembly having a natural torsional vibration frequency as determined by the moment of inertia and spring constant thereof, a contactor strip with a rounded projection fixed to one face of said magnet ring and electrically connected to said first spring, a contact strip mounted on said housing and extending substantially parallel to said second axis and disposed generally on a tangent to said ring periphery to lie in engagement with said contactor strip in the quiescent state of said ring, output terminals connected to said contact strip and to said first spring, first and second serially connected input coils surrounding said ring and parallel to and on opposite sides of said second axis, and means to impress said sub-audio frequency on said input coils to establish an alternating field generally perpendicular to said first and second axes to act on said magnet ring, whereby when said sub-audio frequency agrees with the natural torsional vibration frequency of said magnet and spring assembly said magnet ring is urged into torsional vibrations of an amplitude sufficient to have said contactor strip intermittently engage said contact strip at said sub-audio frequency.

References Cited by the Examiner

UNITED STATES PATENTS

| | | | |
|---|---|---|---|
| 1,328,825 | 1/20 | Drysdale | 200—91 |
| 1,604,533 | 10/26 | Ryan | 317—147 |
| 1,732,313 | 10/29 | Nyquist et al. | 333—71 X |
| 2,435,487 | 2/48 | Adler | 317—171 X |
| 2,635,155 | 8/53 | Barr | 200—93.3 X |
| 2,670,460 | 2/54 | Gilbert | 200—91 |
| 2,736,869 | 2/56 | Rex | 317—171 X |
| 2,753,529 | 7/56 | Maron et al. | 333—71 |
| 2,897,412 | 7/59 | Longenecker et al. | 317—147 |

SAMUEL BERNSTEIN, *Primary Examiner.*

MAX L. LEVY, *Examiner.*